United States Patent [19]
Perloff

[11] 3,846,688
[45] Nov. 5, 1974

[54] MACHINE WORK SENSOR

[75] Inventor: Ronald S. Perloff, Shaker Heights, Ohio

[73] Assignee: Electron Inc., Bratenahl, Ohio

[22] Filed: July 18, 1973

[21] Appl. No.: 380,406

[52] U.S. Cl............... 318/490, 318/438, 318/565, 307/126, 324/158 MG
[51] Int. Cl. ............................................ H02p 5/28
[58] Field of Search ........... 318/490, 565, 438, 430, 318/432; 307/127, 126; 324/89, 158 MG

[56] References Cited
UNITED STATES PATENTS

| | | | |
|---|---|---|---|
| 3,482,236 | 12/1969 | Seney | 318/490 X |
| 3,525,904 | 8/1970 | Ringstad | 307/127 X |
| 3,535,593 | 10/1970 | Schweitzer, Jr. | 307/127 X |
| 3,673,425 | 6/1972 | Plichta | 307/127 |
| 3,727,103 | 4/1973 | Finch et al. | 307/127 X |

*Primary Examiner*—B. Dobeck
*Attorney, Agent, or Firm*—McNenny, Farrington, Pearne & Gordon

[57] ABSTRACT

An improved work sensor circuit for single or multi-phase electric motors wherein a change in work load produces a test voltage, thereby providing a convenient and sensitive way of measuring load and load changes. According to the invention, a vectorial combination of voltage signals representing motor current and motor voltage is produced in a first circuit portion to provide a test voltage which is operated on by additional circuitry to indicate changes in motor load, the rate of change, and the direction of change.

10 Claims, 5 Drawing Figures

3,846,688

MACHINE WORK SENSOR

BACKGROUND OF THE INVENTION

The field of invention to which the machine work sensor relates is the measurement of motor load and changes in motor load.

Motor load sensing is an important industrial technique for monitoring the operation of a machine tool, for example, to ascertain when a tool is cutting. Such information may be used to count the number of pieces produced on a machine and/or sense a failure of a tool or other part in the machine. Prior art systems are typically expensive and complicated, sometimes using active devices requiring power supplies or having elaborate adjusting mechanisms to bring about the desired results.

Known devices usually must be set and balanced each time a certain level of quiescent running motor load is developed and then changes may only be measured around this predetermined point. Another common problem has been the necessity for providing a loading element in the current and/or voltage legs of the measuring circuit. In high current or high voltage operations, the potential drop across resistance elements may be significant enough to affect system operation.

Other problems arise in determining the rate and direction of the load change. Determination of the direction of load change is useful, for example, in sensing whether a tool is contacting the workpiece or whether it is being removed from the workpiece. Often, circuits which attempt to measure only power requirements of motors do not provide this necessary information on the change in load and are used primarily in summing up the power used rather than the sensing and reporting of instantaneous changes.

SUMMARY OF THE INVENTION

The invention relates to an improved load sensing circuit for indicating changes in work load on single or multiphase motors. The invention provides a primary circuit having a minimum of hardware and having a high degree of flexibility for sensing changes in load on a.c. motors. Additional circuitry is provided for indicating the direction of load change, either increases or decreases, and the rate at which such changes occur. This additional circuitry detects a change in load from a normal or quiescent running level rather than measuring the absolute magnitude of the load levels themselves. The circuitry is thereby insensitive to relatively slow drifting of motor load levels, such as produced by tool wear or temperature changes in the machine tool. Moreover, since the circuitry is sensitive to changes in load, it does not need adjustment or calibration whenever machine operating conditions are deliberately changed, such as when feed rates are altered.

The invention electronically combines input signals using only passive devices, which do not require elaborate power supplies of active elements. Along with its simplified power requirements, the combination of the input signals requires no intricate balancing techniques to produce a useful output signal.

In the disclosed embodiments, a change in motor load is sensed as a change in phase angle between motor current and voltage. In a.c. motors, a relatively small change in load is evidenced by a measurable change in phase angle. Preferably, an analogue voltage representing line voltage in phase is produced by a step-down transformer having its primary coil connected across a pair of power lines to the motor. A second analogue voltage representing line current in phase is developed by the combination of a toroid transformer and a step-up transformer. A power conductor for the motor forms a primary coil on the toroid. The secondary of the toroid produces a voltage which is stepped up by the step-up transformer to an amplitude approximately equal to the amplitude of the voltage analogue. The voltage and current analogues are vectorially added by connecting the secondaries of the step-down and step-up transformers in series. The magnitude of the output voltage vector varies directly with the phase angle between motor voltage and current.

In one embodiment, this output voltage may be either used directly or rectified and filtered to develop a constant peak value. In either of these arrangements, the output signal may be used where the circuit is employed to sense the magnitude of the actual load.

In another embodiment, the output voltage of the primary circuit is applied to a double detecting circuit which is responsive only to changes between load levels and is non-responsive to the absolute value of such levels. This latter circuit arrangement is particularly suited for applications where the quiescent running load on the machine is subject to variations such as produced when feed rates are increased, temperatures and frictional resistance in the machine change, or tool wear occurs. In such situations, this circuit ignores gradual changes in load and changes in absolute magnitude of load so that the circuit need not be recalibrated or adjusted whenever they occur.

DESCRIPTION OF THE PREFERRED EMBODIMENTS

Figure 1:
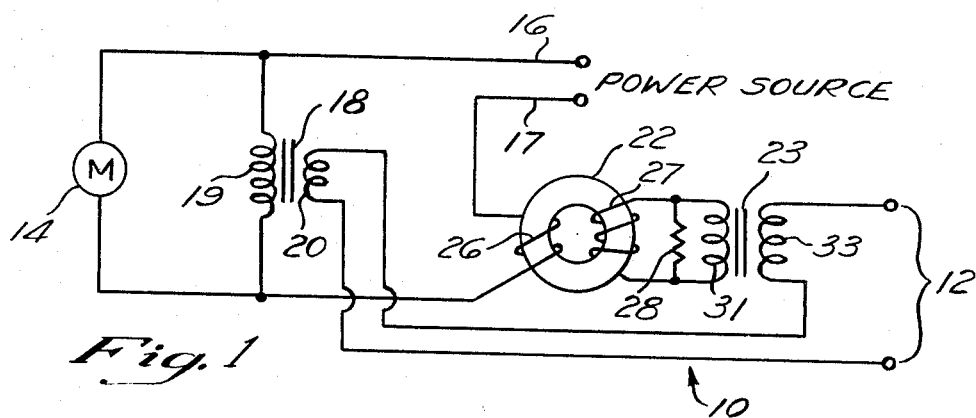
FIG. 1 is a schematic drawing of circuitry for vectorially combining analogue signals for sensing changes in phase angle between motor voltage and motor current.

FIG. 1 illustrates a circuit 10 for producing an output voltage signal across a pair of terminals 12 variable with the phase angle between the current and voltage in a single-phase a.c. motor 14. Electrical power is supplied to the motor 14 by a pair of conductor lines 16 and 17 connected to a power source such as a utility power line. A step-down transformer 18 provides an analogue voltage signal representing the voltage across the power lines 16 and 17. A primary coil 19 of the transformer 18, shunted across the motor 14 and the lines 16 and 17, induces a voltage of reduced amplitude in a secondary coil 20. The induced voltage in the secondary coil 20, ideally, has an amplitude readily used in conventional control circuits, e.g., between 5 and 120 volts, and preferably between 8 and 20 volts. This reduced voltage is substantially in phase with the supply voltage on the motor 14.

Current in the motor 14 is sensed by a toroid transformer 22 and a step-up transformer 23. One of the power lines 17 is passed through the core of the toroid 22 one or more times to form a primary coil 26. Current through the motor 14 and the coil 26 induces a voltage on a secondary coil 27. A suitable load resistor 28 and a primary coil 31 of the step-up transformer 23 are shunted across this coil 27. A secondary coil 33 multiplies the voltage in the primary coil 31 to a suitable level. The toroid 22 and step-up transformer 23 preferably are arranged in combination to produce a final voltage amplitude in the coil 33 approximately equal to the amplitude developed by the step-down transformer 18, or, at least, within ± 20 percent of it.

The toroid transformer 22 affords great flexibility in the circuit by permitting the power line 17 to be looped through it as many times as is necessary to produce a satisfactory voltage analogue signal across the secondary coil 33. In use with lower amperage applications, e.g., 5 amps. or less, a suitable number of loops at the coil 26 are used, while above this current, only one or a limited number of loops is necessary. It may also be appreciated that the toroid transformer 22 avoids the use of devices which must carry the full current of the motor.

The voltage analogue signal on the secondary coil 33 of the step-up transformer is substantially in phase with the current in the motor 14. This current analogue voltage is vectorially added to the voltage analogue of the motor voltage by serially connecting the secondary coils 33 and 20 of their respective transformers 23 and 18. This vectorial addition appears across the terminals 12.

Figure 4:
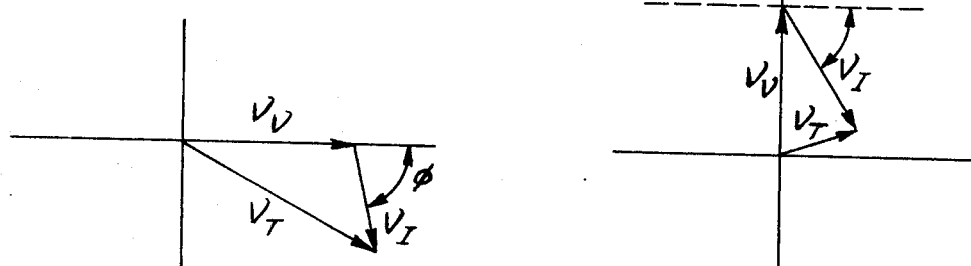
FIG. 4 is a phasor diagram of the analogue signals developed by the circuit illustrated in FIG. 1 in a single phase case.

When the motor 14 is under no load, the motor voltage and motor current are out-of-phase by approximately 90 degrees, while under full load, the voltage and current are in phase. FIG. 4 represents a phasor diagram of the relationship between motor current represented by the analogue voltage $V_I$ and motor voltage represented by the analogue voltage $V_v$ under light load. It may be assumed, where the amplitudes of $V_v$ and $V_I$ are equal, that:

$V_v = V_m \cos(\omega\tau)$ and $V_I = V_m \cos(\omega\tau - \phi)$ $V_T = V_v + V_I = V_m \sqrt{2(1+\cos\phi)} \cos(\omega\tau - \phi/2)$ where:

$V_m$ is the amplitude of the voltage on the transformer secondaries 20, 33, and $V_T$ is the vectorial sum or test voltage on the output terminals 12.

Depending on the phase angle $\phi$, $V_T$ varies from $\sqrt{2} V_m \cos(\omega\tau - 45°)$ to $2 V_m \cos(\omega\tau)$, for angles of $\phi =$ to 90° (no load) to $\phi = 0°$ (full load). From this, it may be appreciated that the amplitude of $V_T$ ranges between $\sqrt{2} V_m$ at no load to $2 V_m$ at full load.

The signal across the terminals 12 of the load measuring circuit 10 may be used directly, such as where it is desired to determine when the motor 14 is loaded or unloaded to a certain point. For example, a meter relay may be connected to the terminals 12, with its threshhold set at a predetermined point representing the load level to be indicated.

Figure 3:
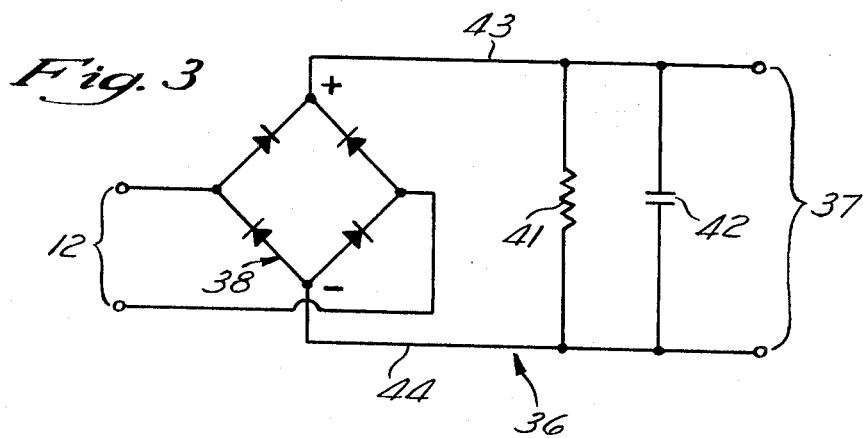
FIG. 3 is a schematic drawing of a simplified phase change detector circuit in accordance with another embodiment of the invention.

A circuit 36 illustrated in FIG. 3 is provided to modify the control signal at the terminals 12 to form a continuous peak value at a pair of outlet terminals 37. The circuit 36 includes a diode bridge or rectifier 38. A resistor 41 and capacitor 42 in parallel across output lines 43 and 44 of the bridge 38 filter the full-wave rectified signal from the bridge to provide a substantially d.c. signal at the terminals 37. This signal may be used in a manner similar to that discussed in relation to the signal at the terminals 12, and particularly in systems requiring a d.c. signal.

Figure 2:
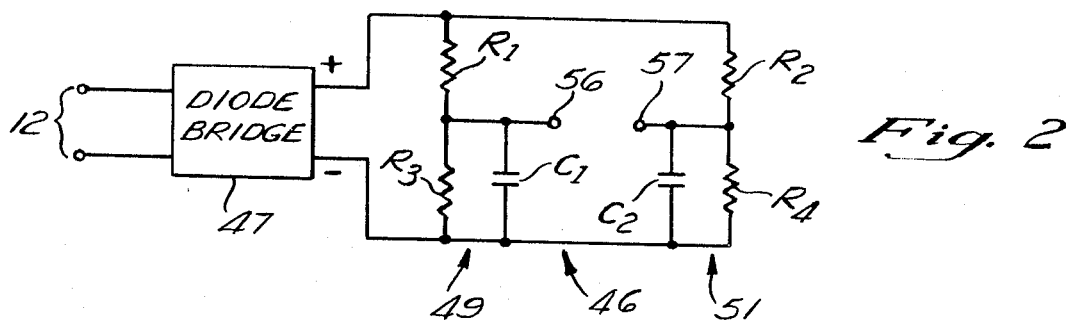
FIG. 2 is a schematic drawing of a phase change detector circuit in accordance with one embodiment of the invention.

FIG. 2 illustrates another embodiment of the invention, wherein a circuit 46 is again arranged to modify the signal on the terminals 12. The circuit 46 is particularly adapted for use in systems where the quiescent motor work load fluctuates due to changes in motor operating conditions and it is undesirable to reset or recalibrate a device or additional circuitry monitoring motor load after each change in operating conditions. The circuit 46 includes a diode bridge 47 or a rectifier such as the bridge 38 illustrated in FIG. 3.

The rectified voltage signal from the bridge 47 is simultaneously detected by two subcircuits 49 and 51. Each subcircuit 49, 51 includes a pair of series-connected resistors R1, R3 and R2, R4 respectively, and a capacitor C1 and C2 across corresponding resistors R3, R4. C1 is selected to be substantially greater than C2 in capacitance, while R1 is equal to R2 and R3 is equal to R4 in resistance.

Under constant loading or operating conditions on the motor 14, a pair of output terminals 56 and 57 of the circuit 46 will be at substantially the same voltage potential; i.e., there is normally no voltage potential between these terminals 56, 57. When motor load increases or decreases, a temporary voltage differential will appear across the terminals 56 and 57 owing to the relatively slower charging and discharging rate of the larger capacitor C1. The subcircuit 51 associated with the smaller capacitor C2 will follow a change in motor load by producing a higher or lower voltage at its terminals 57 substantially immediately, while such a change at the opposite terminal 56 will take a longer time, depending on the values of the resistors and capacitors selected.

The circuit 46 is insensitive or nonresponsive to gradual changes in operating conditions such as produced by tool wear or minor slow adjustments in tool feed rates, because the rate of change in motor load associated with these variances will normally be quite slow in comparison to the response rate of the circuit 46 and because the circuit is nonresponsive to the absolute magnitude of a load level. Where a large change in motor load is developed, such as where a change in feed rate for example is substantial, the circuit 46 does not need to be recalibrated, since it will merely respond once, simultaneously with the change, and then will reach equilibrium.

The circuit 46 also indicates the rate of change of motor load by the magnitude or amplitude of the voltage differential between the output terminals 56 and 57. The magnitude of this voltage differential will be proportional to the rate since the larger capacitor circuit 49 will lag the opposite circuit 51 for a greater fraction of the time of a load change during a fast change, allowing the faster circuit 51 to outdistance the slower circuit 49 to a greater degree. The circuit 46 indicates the direction of change of a load by the polarity developed at the terminals 56, 57 relative to one another. With the polarity of the bridge 47 as indicated, the terminal 57 will become positive relative to the opposite terminal 56 on an increase in load and negative on a decrease in load.

Figure 5:
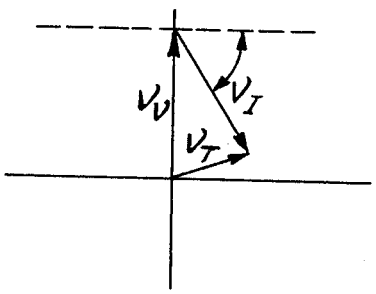
FIG. 5 is a phasor diagram, similar to FIG. 4, in a three-phase system.

The above-disclosed circuits 10, 36, and 46 may be employed with multiphase a.c. motors. This is accomplished in a three-phase system by connecting the transformer 18 across two legs of the three-phase circuit and sensing current in the third leg of the system with the toroid transformer 22. FIG. 5 represents the voltage analogue vectors, where $V_v = V_m \cos(\omega \tau = 90°)$
$V_I = V_m \cos(\omega \tau - \phi)$ In the three-phase case, $V_t = V_v + V_I = V_m \sqrt{2(1-\sin\phi)} \cos(\omega\tau + 45 - \phi/2)$, the output test voltage $V_T$ on the terminals 12 varies from 0 to $\sqrt{2} V_m \cos(\omega\tau + 45°)$ for angles of $\phi = 90°$ (no load) to $\phi = 0°$ (full load).

By sensing a change in phase angle between current and voltage, the invention takes advantage of relatively large changes in this angle, as compared to other changes under load, such as a relatively smaller change in current, and so that maximum sensitivity is achieved.

Although preferred embodiments of the invention are illustrated, it is to be understood that various other modifications and rearrangements of elements may be resorted to without departing from the scope of the invention disclosed and claimed herein.

What is claimed is:

1. An electrical circuit for sensing the load on a motor comprising a plurality of lines for carrying electrical power from a source to a motor, a step-down transformer having a primary coil shunted across two of said lines, said step-down transformer providing at its secondary coil a reduced voltage in phase with line voltage, one of said power lines forming a primary coil in a toroidal transformer, the toroidal transformer including a secondary coil providing a voltage in phase with line current, said toroidal transformer secondary coil driving the primary of a step-up transformer, the outputs of the step-down and step-up transformers being arranged to be substantially equal in magnitude and being connected in series to form a vectorial output signal variable between upper and lower amplitude limits in response to a change in the phase angle between motor voltage and motor current caused by a change in load on the motor.

2. A circuit as set forth in claim 1, including a rectifier driven by said output signal and filtering means connected to an output of the rectifier to produce a continual peak voltage.

3. A circuit as set forth in claim 1, including means responsive to changes in said output signal and nonresponsive to the differences in the absolute value of said output signal.

4. A circuit as set forth in claim 3, wherein said responsive means includes a double detection circuit having means of differing response time whereby an unbalance in the double detection circuit is produced during a change in motor load.

5. An electrical circuit for sensing a change in load on an electric motor comprising a plurality of power lines connected to a motor, means connected to said power lines to produce a test voltage signal proportional to load on the motor, said test voltage signal producing means including means responsive to changes in phase angle between motor current and voltage in the range of 0° and 90°, and a detecting circuit monitoring said test voltage signal, said detecting circuit including means responsive to changes in motor load by assuming one polarity when load increases and an opposite polarity when motor load decreases.

6. An electrical circuit for sensing a change in load on an electric motor comprising a plurality of power lines connected to a motor, means connected to said power lines to produce a test voltage signal proportional to load on the motor, and a detecting circuit monitoring said test voltage signal, said detecting circuit including means responsive to changes in motor load by assuming one polarity when load increases and an opposite polarity when motor load decreases, said responsive means including means to indicate the rate of change of motor load by producing an output voltage magnitude proportional to the rate of change of load.

7. A circuit as set forth in claim 6, wherein said test voltage producing means includes means sensitive to changes in the phase angle between supply voltage and current in said power lines.

8. A circuit as set forth in claim 7, wherein said sensitive means includes means to form said test voltage signal as a vectorial representation of line voltage and line current.

9. A circuit as set forth in claim 8, wherein said detecting circuit comprises a pair of detecting subcircuits connected in parallel to said test voltage signal and having differing response rates.

10. An electrical circuit for measuring changes in load on an a.c. motor comprising a plurality of lines for conducting electrical power from a source to a motor, a step-down transformer having a primary coil shunted across two of said lines, said step-down transformer including a secondary coil for providing a reduced voltage in phase with line voltage, a toroidal transformer, one of said power conducting lines being looped through said toroidal transformer to form a primary coil, the toroidal transformer including a secondary coil providing a voltage in phase with line current, said toroidal secondary coil driving the primary of a step-up transformer, the voltage outputs of the secondary coils of the step-down transformer and the step-up transformer being arranged to be substantially equal in amplitude and being serially connected to form a vectorial output signal variable between upper and lower amplitude limits in response to changes in the phase angle between motor voltage and current due to variations in load on the motor, a rectifier driven by said output signal, a pair of parallel detecting circuits on the output of said rectifier, each of said detecting circuits including a parallel resistor and capacitor, the values of the resistor and capacitor of each circuit being selected to provide a substantially different response time from that of the other circuit such that a differential voltage is developed between said capacitors when said output signal changes in magnitude.

* * * * *